United States Patent
Jung

(10) Patent No.: US 9,140,395 B2
(45) Date of Patent: Sep. 22, 2015

(54) PLASTIC FEMALE SCREW CONNECTOR USING INJECTION MOLDING

(75) Inventor: Ho-Jin Jung, Seoul (KR)

(73) Assignee: SOFTCHEM INC., Seoul (KR)

( * ) Notice: Subject to any disclaimer, the term of this patent is extended or adjusted under 35 U.S.C. 154(b) by 591 days.

(21) Appl. No.: 13/191,821

(22) Filed: Jul. 27, 2011

(65) Prior Publication Data

US 2012/0056423 A1 Mar. 8, 2012

(30) Foreign Application Priority Data

Jul. 28, 2010 (KR) .......................... 10-2010-0072980

(51) Int. Cl.
*F16L 47/04* (2006.01)
*F16L 15/06* (2006.01)

(52) U.S. Cl.
CPC ................ *F16L 47/04* (2013.01); *F16L 15/06* (2013.01)

(58) Field of Classification Search
USPC ......... 285/353, 355–357, 384–385, 393, 423, 285/909, 245, 247, 251
See application file for complete search history.

(56) References Cited

U.S. PATENT DOCUMENTS

| 500,412 | A | * | 6/1893 | McIntyre | 285/148.6 |
|---|---|---|---|---|---|
| 1,985,012 | A | * | 12/1934 | Boehm | 285/190 |
| 2,158,538 | A | * | 5/1939 | Gish | 285/245 |
| 2,333,350 | A | * | 11/1943 | Weatherhead, Jr. | 285/251 |
| 2,805,871 | A | * | 9/1957 | Hammon | 285/18 |
| 2,809,056 | A | * | 10/1957 | Kaiser | 285/251 |
| 2,877,027 | A | * | 3/1959 | Bagnell | 285/247 |
| 2,933,428 | A | * | 4/1960 | Mueller | 156/73.5 |
| 3,140,106 | A | * | 7/1964 | Thomas et al. | 285/248 |
| 3,630,548 | A | * | 12/1971 | Kimm et al. | 285/247 |
| 3,752,506 | A | * | 8/1973 | Fouts | 285/179 |
| 4,692,563 | A | * | 9/1987 | Lackinger | 174/654 |
| 4,801,158 | A | * | 1/1989 | Gomi | 285/52 |
| 8,500,175 | B2 | * | 8/2013 | Jung | 285/386 |

* cited by examiner

*Primary Examiner* — David E Bochna
(74) *Attorney, Agent, or Firm* — Kile Park Reed & Houtteman PLLC

(57) ABSTRACT

Provided is a female screw connector suitable for connecting pipes. In some embodiments, the female screw connector includes a first body part, a second body part, a rotating connection part, and a fixed connection part. The first body part includes a first external thread portion and a projecting portion, and the second body part includes a second external thread portion and a bolt head portion. The rotating connection part includes a rotation guide portion and a first internal thread portion, and the fixed connection part includes a second internal thread portion. When assembled, the second external thread portion may be threadedly coupled with the second internal thread portion, and the first body part may extend at least partially through the fixed connection part. Also, the first body part, the second body part, the rotating connection part, and the fixed connection part may each be made of a plastic material.

8 Claims, 3 Drawing Sheets

<Cross-sectional view illustrating the trapezoidal thread 1a>

<Cross-sectional view illustrating the square thread 1b>

<Cross-sectional view illustrating the round thread 1c>

<Cross-sectional view illustrating the buttress thread 1d>

PLASTIC FEMALE SCREW CONNECTOR USING INJECTION MOLDING

CROSS-REFERENCE TO RELATED APPLICATION

This application claims priority to Korean Patent Application No. 10-2010-0072980, filed on Jul. 28, 2010, the contents of which are incorporated herein by reference in their entirety.

BACKGROUND OF THE INVENTION

1. Field of the Invention

The present invention relates to a connector used to connect pipes for conveying a fluid, and more particularly, to a plastic female screw connector which is manufactured through injection molding to replace a conventional screw connector made of a costly metallic material with an injecting-molded plastic screw connector so that the manufacturing costs can be reduced.

2. Description of the Related Art

In general, among methods for conveying a fluid, a method of connecting unit pipes and applying a pressure to a fluid so as to convey the fluid to a distant place is most widely used.

In order to connect pipes, connecting methods such as welding, flange coupling, and so forth are used. In this regard, in connecting copper pipes for an air handling unit such as an air conditioner, it is the norm that a connector with threads formed on a connection part is used.

In this way, in the conventional art, in order to connect XL pipes or pipes for an air handling unit, threads are formed on a portion of each pipe so that the pipe can be threadedly assembled by being rotated. However, such a type of connector is vulnerable to a high pressure or a high fluid pressure. Also, in the case where a work space for connecting pipes is narrow, it may be impossible to carry out connection work by rotating the pipes.

In order to solve these problems, research has been conducted for a screw connector with a rotating connection part to allow both pipes to be connected with each other even by not rotating the pipes.

FIG. 1 is an exploded perspective view illustrating the assembling relationship of a conventional screw connector made of a metallic material.

Referring to FIG. 1, a conventional screw connector 1 made of a metallic material includes a body part 10, a rotating connection part 20, a tightening part 30, and a fixed connection part 40, which are assembled with one another.

The body part 10 has a hexagonal bolt head portion 11. A projecting portion 12 is formed on one side of the hexagonal bolt head portion 11, and a large external thread portion 13 and a small external thread portion 14 with a different outer diameter from the large external thread portion 13 are integrally formed on the other side of the hexagonal bolt head portion 11. The projecting portion 12 serves as a portion which is squeezed against and coupled with the rotating connection part 20, and the small external thread portion 14 serves as a portion which is inserted into and threadedly coupled to a pipe. The large external thread portion 13 serves as a portion which is threadedly coupled to the fixed connection part 40.

The rotating connection part 20 is formed on the inner surface thereof with a rotation guide portion (not shown) in the shape of a groove, such that the rotating connection part 20 can be coupled with the projecting portion 12 of the body part 10 while being capable of rotating. Opposite to the rotation guide portion, a thread portion is formed on the inner surface of the rotating connection part 20.

The tightening part 30 is to be placed outside a portion of a pipe which is coupled with the small external thread portion 14. The tightening part 30 functions to tighten once more the pipe coupled with the connector 1 and maintain secure coupling of the connector 1 and the pipe.

The fixed connection part 40 is coupled with the large external thread portion 13, by which the assembly of the connector 1 is completed. In the connector 1, by the rotating function of the rotating connection part 20, interconnection of a shaft and a pipe or interconnection of pipes can be easily implemented without undergoing twisting.

However, the conventional screw connector has a disadvantage in that, since it is made of a metallic material such as copper or stainless steel, it costs high.

An air conditioner for heating and cooling purposes is placed under a higher temperature and a higher pressure than a situation where general pipes are used. Also, in the air conditioner, not a fluid such as water used in a general piping, but a solvent, in which oil capable of being easily vaporized and compressed and with very high chemical reactivity and oil are mixed with the same phase, is frequently used.

If the connector made of a metallic material is used under these conditions, it is difficult to maintain a sealed state due to contraction and expansion characteristics of a metal, and chemical resistance and friction resistance are likely to deteriorate in that fluid flow may be impeded or a pressure load may be induced by corrosion of a connecting portion resulting from the characteristics of a refrigerant used.

SUMMARY OF THE INVENTION

Accordingly, the present invention has been made in an effort to solve the problems occurring in the related art, and an object of the present invention is to provide a plastic female screw connector which is manufactured through injection molding of plastic to replace a screw connector made of a metallic material so that piping work can be easily carried out and the manufacturing costs can be significantly reduced.

In order to achieve the above object, according to one aspect of the present invention, there is provided a female screw connector suitable for connecting pipes, including: a first body part having a body portion, formed with a first external thread portion on one end of the body portion and with a projecting portion on the other end of the body portion, and defined therethrough with a fluid flow path; a second body part formed on one end thereof with a second external thread portion which has an outer diameter larger than the first external thread portion, and on the other end thereof with a bolt head portion which is fitted around the body portion of the first body part; a rotating connection part having the shape of a nut, formed with a rotation guide portion on an inner surface adjacent to one end thereof such that the projecting portion of the first body part is seated on the rotation guide portion so that the first body part is coupled with the rotating connection part, and with a first internal thread portion on the inner surface thereof, the rotating connection part being capable of rotating; and a fixed connection part having the shape of a nut, formed with a second internal thread portion on an inner surface thereof such that the second external thread portion is threadedly coupled with the second internal thread portion and a pipe is coupled to one end of the fixed connection part, wherein the first body part, the second body part, the rotating connection part and the fixed connection part are manufactured through injection molding of a plastic material.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
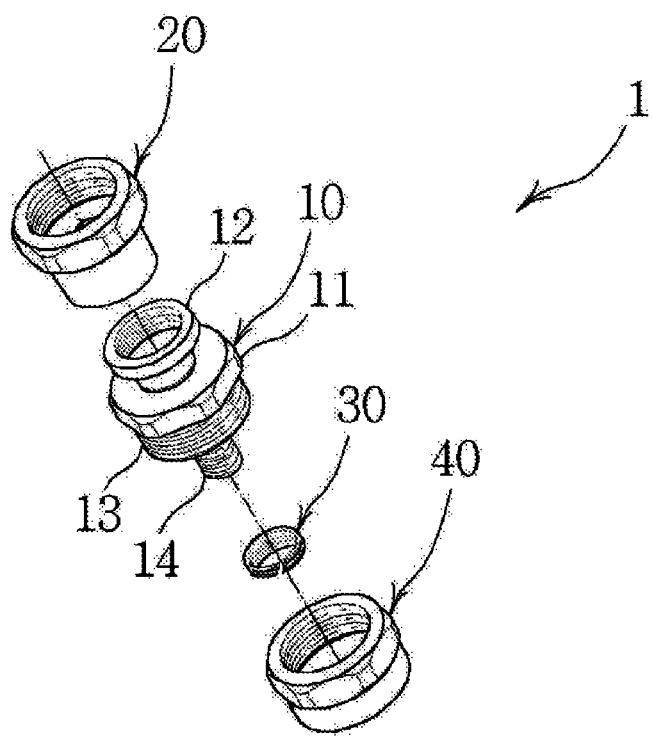
FIG. 1 is an exploded perspective view illustrating the assembling relationship of a conventional screw connector made of a metallic material.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
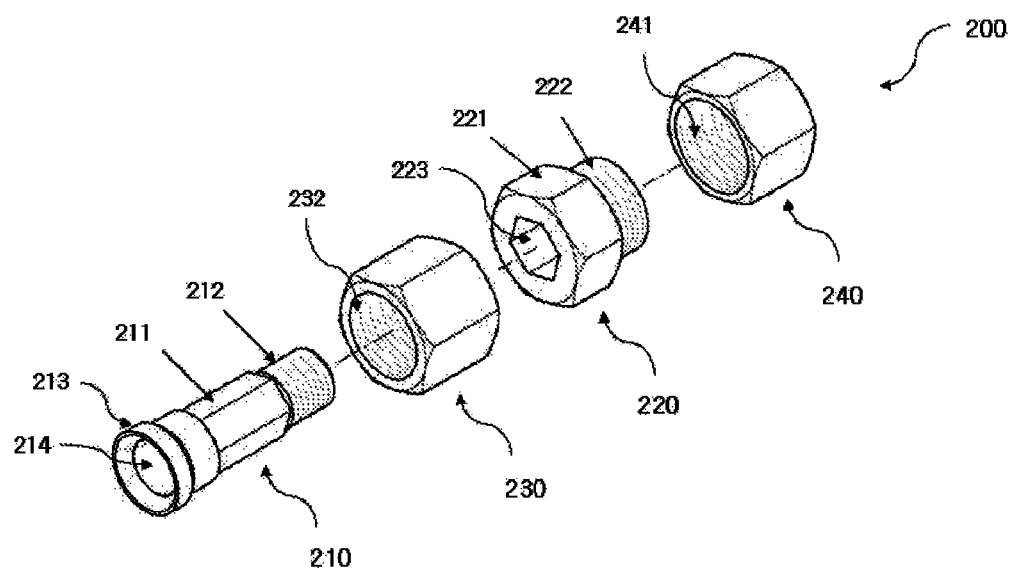
FIG. 2 is an exploded perspective view illustrating the assembling relationship of a plastic female screw connector manufactured through injection molding in accordance with an embodiment of the present invention.
Figure 3:
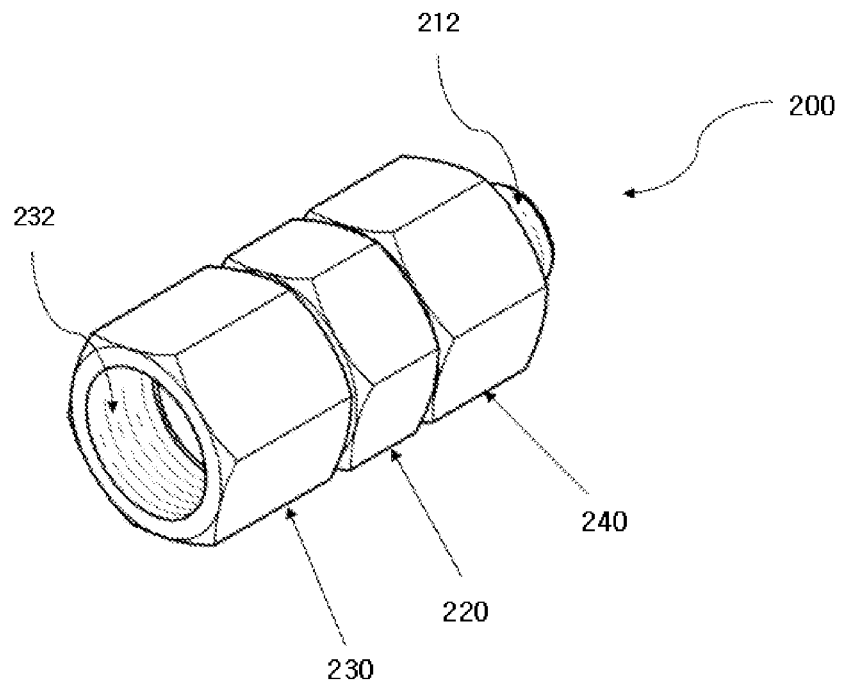
FIG. 3 is a perspective view illustrating the assembled state of the plastic female screw connector manufactured through injection molding in accordance with the embodiment of the present invention.
Figure 4:
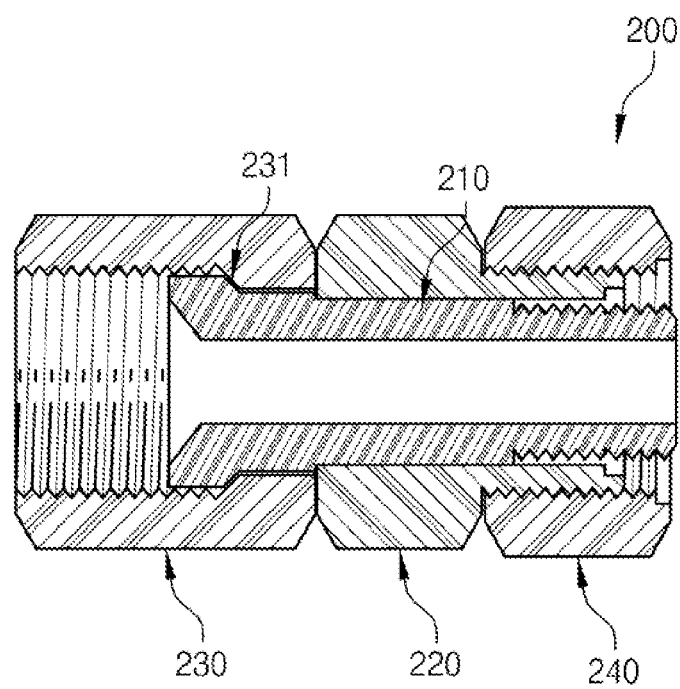
FIG. 4 is a cross-sectional view of FIG. 3.
Figure 5:
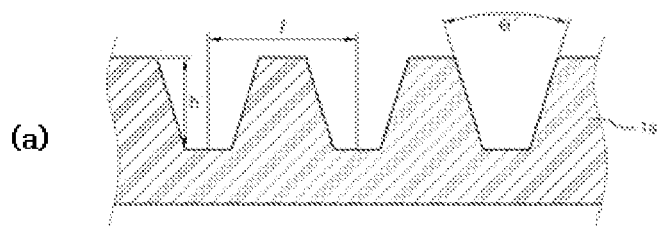
FIG. 5a is a cross-sectional view illustrating a trapezoidal thread portion of the plastic female screw connector in accordance with an embodiment of the present invention.
FIG. 5b is a cross-sectional view illustrating a square thread portion of the plastic female screw connector in accordance with an embodiment of the present invention.
FIG. 5c is a cross-sectional view illustrating a round thread portion of the plastic female screw connector in accordance with an embodiment of the present invention.
FIG. 5d is a cross-sectional view illustrating a buttress thread portion of the plastic female screw connector in accordance with an embodiment of the present invention.
Figure 5:
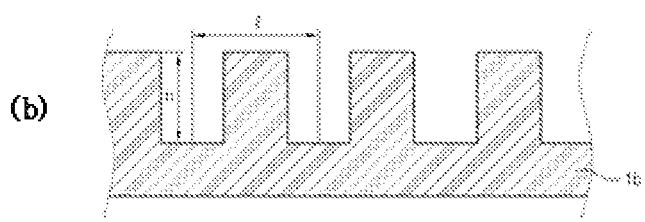
Figure 5:
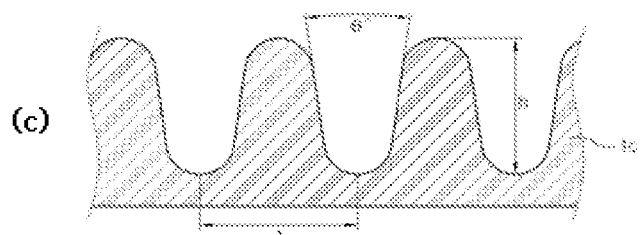
Figure 5:
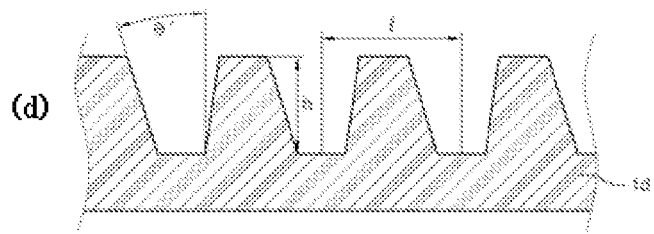

FIG. 2 is an exploded perspective view illustrating the assembling relationship of a plastic female screw connector manufactured through injection molding in accordance with an embodiment of the present invention, FIG. 3 is a perspective view illustrating the assembled state of the plastic female screw connector manufactured through injection molding in accordance with the embodiment of the present invention, and FIG. 4 is a cross-sectional view of FIG. 3.

Referring to FIGS. 2 to 4, a plastic female screw connector 200 manufactured through injection molding in accordance with an embodiment of the present invention includes a first body part 210, a second body part 220, a rotating connection part 230, and a fixed connection part 240.

The components of the plastic female screw connector 200 manufactured through injection molding in accordance with the embodiment of the present invention, that is, the first body part 210, the second body part 220, the rotating connection part 230 and the fixed connection part 240 are manufactured through injection molding of a plastic material with a polymer structure which has a high molecular weight.

The key idea of the present invention resides in that a connector is manufactured through injection molding of a plastic material with a high molecular weight polymer structure which can endure a high temperature and a high pressure under conditions such as in an air conditioner for heating and cooling purposes and which does not chemically react with a working fluid with high chemical reactivity or does not have a radical for sharing a reaction group.

That is to say, the plastic female screw connector 200 manufactured through injection molding in accordance with the embodiment of the present invention uses components made of a plastic material with a polymer structure in which a chemical crack does not occur at a high temperature (for example, of 60° C.) and under a high pressure (for example, of 100 kgf/cm$^2$) in a condition where gas, oil, sol and gel are mixed and in which the durability and the mechanical characteristics of a high molecular weight structure do not deteriorate.

In other words, the embodiment of the present invention is characterized in that conventional metallic components are replaced with plastic components with a high molecular weight polymer structure, and due to this fact, constructions of components are varied.

Metallic components can be deformed through pressing or bending when they are machined. However, plastic components cannot be deformed through pressing or bending unlike the metallic components.

Further, it is very difficult to manufacture the structure of the body part 10 shown in FIG. 1 through injection molding. Therefore, in the embodiment of the present invention, as shown in FIG. 2, the construction of a body part is divided into the first body part 210 and the second body part 220 which are manufactured through injection molding.

The first body part 210 has a body portion 211. A first external thread portion 212 is formed on one end of the body portion 211, and a projecting portion 213 is integrally formed on the other end of the body portion 211. A fluid flow path 214 is defined through the first body part 210.

The second body part 220 is formed on one end thereof with a second external thread portion 222 which has an outer diameter larger than the first external thread portion 212, and is formed on the other end thereof with a bolt head portion 221 which is fitted around the body portion 211 of the first body part 210.

A hole 223 is defined through the second body part 220 such that the first body part 210 can be inserted through the hole to be coupled with the second body part 220. The hole 223 has the same sectional shape as the body portion 211 of the first body part 210, and preferably, is defined to be slightly larger than the size of the body portion 211 so that the body portion 211 can be inserted through the hole.

The body portion 211 of the first body part 210 is formed to have a sectional shape of a polygon such as a square, a hexagon or an octagon so that the first body part 210 and the second body part 220 can be securely coupled with each other.

The rotating connection part 230 has the shape of a nut. A rotation guide portion 231 is formed on the inner surface adjacent to one end of the rotating connection part 230 such that the projecting portion 213 of the first body part 210 can be seated on the rotation guide portion 231, by which the first body part 210 can be coupled with the rotating connection part 230. A first internal thread portion 232 is formed on the inner surface of the rotating connection part 230. The rotating connection part 230 is formed to permit rotation of a pipe when carrying out pipe connection work.

The fixed connection part 240 has also the shape of a nut. A second internal thread portion 241 is formed on the inner surface of the fixed connection part 240 such that the second external thread portion 222 can be threadedly coupled with the second internal thread portion 241 of the fixed connection part 240. A pipe is coupled to one end of the fixed connection part 240.

The first body part 210, the second body part 220, the rotating connection part 230 and the fixed connection part 240 are manufactured through injection molding of a plastic material.

The components made of a plastic material are manufactured by adding sulfur atoms into a thermoplastic material based on benzene and grafting and crosslinking a resultant.

It was found that the components made of a plastic material exhibit low molding shrinkage of 0.2%. This represents more stable integrity than the shrinkage of a metal according to a temperature change.

It was found that, when annealing is performed for 4 to 6 hours at a temperature of 200° C. to 250° C. after injection-molding the plastic material, a heat deflection temperature is maintained over 300° C. and a hardness of 120 or over is accomplished. By this fact, it can be appreciated that the components made of the plastic material according to the embodiment of the present invention have excellent heat resistance and a hardness of such a degree as not to be cut by a knife.

The components made of the plastic material, which have these characteristics, exhibit excellent chemical resistance with respect to a working solvent used in an air conditioner and a large strength, and the mechanical characteristics of the components do not deteriorate even at a high temperature.

The plastic female screw connector 200 manufactured through injection molding in accordance with the embodiment of the present invention may further include a tightening part (not shown) which is coupled around the pipe connected to the first external thread portion 212 to firmly couple the pipe to the first external thread portion 212.

The plastic female screw connector 200 manufactured through injection molding in accordance with the embodiment of the present invention is assembled in the following sequence.

First, the first external thread portion 212 of the first body part 210 is inserted through the first internal thread portion 232 of the rotating connection part 230 in such a manner that the projecting portion 213 of the first body part 210 is seated on the rotation guide portion 231 of the rotating connection part 230.

Thereafter, the bolt head portion 221 of the second body part 220 is fitted around the first external thread portion 212 of the first body part 210 to be coupled with the body portion 211 of the first body part 210. Then, the second body part 220 and the first body part 210 are bonded with each other using an adhesive.

Finally, the second internal thread portion 241 of the fixed connection part 240 is threadedly coupled to the second external thread portion 222 of the second body part 220 such that the fixed connection part 240 and the second body part 220 are coupled with each other.

The bolt head portion 221 of the second body part 220, the rotating connection part 230 and the fixed connection part 240 are formed to have a sectional shape of a polygon such as a square, a hexagon or an octagon so that pipe connection work can be easily carried out.

As can be readily seen from the above descriptions, the embodiment of the present invention is characterized in that a connector is manufactured through injection molding of a plastic material with a high molecular weight polymer structure so as to solve the problems caused in a conventional connector made of a metallic material and a body part is divided into a first body part and a second body part in consideration of the properties of the plastic material.

FIGS. 5a to 5d are cross-sectional views illustrating several kinds of thread portions of the plastic female screw connector manufactured through injection molding in accordance with the embodiment of the present invention.

Referring to FIGS. 5a to 5d, preferably, the first external thread portion 212, the second external thread portion 222, the first internal thread portion 232, and the second internal thread portion 241 include any one thread selected from among a trapezoidal thread 1a, a square thread 1b, a round thread 1c, and a buttress thread 1d.

Preferably, the trapezoidal thread 1a has a thread angle θ of 29°~61°, the round thread 1c has a thread angle θ of 29°~31°, and the buttress thread 1d has a thread angle θ of 39°~46°.

Preferably, the trapezoidal thread 1a, the square thread 1b, the round thread 1c and the buttress thread 1d have a distance l between roots and a height h in the range of 0.25~6 mm.

The angle θ of a screw thread means the angle of a helical ridge with a uniform sectional shape, which projects from the surface of a male screw or a female screw. It is preferred that the ranges of the thread angles of the trapezoidal thread 1a, the round thread 1c and the buttress thread 1d be maintained since meshing between threads becomes appropriate.

It is preferred that the distance l between roots and the height h be maintained in the range of 0.25~6 mm because meshing between threads becomes inappropriate or molding becomes difficult when the distance l between roots and the height h go beyond the range of 0.25~6 mm.

As is apparent from the above description, the plastic female screw connector manufactured through injection molding according to the embodiment of the present invention provides advantages in that, since a screw connector for connecting pipes is manufactured through injection molding of a plastic material, mass production of the screw connector becomes possible and the manufacturing costs can be significantly reduced.

Also, because the screw connector is made of the plastic material, excellent pressure resistance with respect to a high pressure, corrosion resistance with respect to a fluid used, and friction resistance can be accomplished.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. An injection molded plastic female screw connector suitable for connecting pipes, comprising:
   a first body part having a body portion, formed with an external polygonal shape and with an external thread portion on one end of the body portion and with a projecting portion on the other end of the body portion, and defined therethrough with a central fluid flow path;
   a second body part formed with an internal polygonal shape compatible with the external polygonal shape of said first body part and on one end thereof with an external thread portion which has an outer diameter larger than the external thread portion of said body portion of said first body part, and on the other end thereof with a bolt head portion which is fitted around the body portion of the first body part;
   a rotating connection part having a shape of a nut, formed with a rotation guide portion on an inner surface adjacent to one end thereof such that the projecting portion of the first body part is seated on the rotation guide portion so that the first body part is coupled with the rotating connection part, and with an internal thread portion on the inner surface thereof, the rotating connection part being capable of rotating; and a fixed connection part having the shape of a nut, formed with an internal thread portion on an inner surface thereof such that the external thread portion of said second body part is threadedly coupled with the internal thread portion of said fixed connection part and is operable to be connected to a pipe coupled to the fixed connection part, wherein the first body part, the second body part, the rotating connection part, and the fixed connection part are each made of an injection molded plastic material, and wherein the first body part extends through said second body part and at least partially through the fixed connection part.

2. A method of assembling an injection molded plastic female screw connector according to claim 1, the method comprising:

assembling the injection molded plastic female screw connector in such a manner that the external thread portion of the first body part is inserted through the internal thread portion of the rotating connection part so that the projecting portion of the first body part is seated on the rotation guide portion of the rotating connection part, in such a manner that the bolt head portion of the second body part is fitted around the external thread portion of the first body part to be coupled with the body portion of the first body part, in such a manner that the second body part and the first body part are mated with each other, and in such a manner that the internal thread portion of the fixed connection part is threadedly coupled to the external thread portion of the second body part such that the fixed connection part and the second body part are coupled with each other.

3. A method of manufacturing an injection molded plastic female screw connector according to claim 1, the method comprising:

manufacturing the plastic material by adding sulfur atoms into a benzene-based thermoplastic material and crosslinking or annealing a resultant so that the plastic material comprises a high molecular weight polymer structure.

4. The injection molded plastic female screw connector according to claim 1, wherein the bolt head portion of the second body part, the rotating connection part, and the fixed connection part each have a sectional shape of a polygon.

5. The injection molded plastic female screw connector according to claim 1, wherein the external thread portion of the first body part extends at least partially through the internal thread portion of the fixed connection part.

6. The injection molded plastic female screw connector according to claim 1, wherein the external thread portion of the first body part extends at least partially through the external thread portion of the second body part and at least partially through the internal thread portion of the fixed connection part.

7. The injection molded plastic female screw connector according to claim 1, wherein each of the external thread portions and the internal thread portions comprises one of a trapezoidal thread, a square thread, a round thread and a buttress thread.

8. The injection molded plastic female screw connector according to claim 1, wherein said external polygonal shape of said first body part and said internal polygonal shape of said second body part comprise one of a square, a hexagon and an octagon.

* * * * *